US008565729B2

(12) United States Patent
Moseler et al.

(10) Patent No.: US 8,565,729 B2
(45) Date of Patent: Oct. 22, 2013

(54) DEVICES AND METHODS FOR DATA TRANSFER DURING CHARGING OF A PORTABLE DEVICE

(75) Inventors: Kathy Moseler, Barrington Hills, IL (US); David S. Brenner, Round Lake, IL (US); Dale S. Neuzil, Lake Villa, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1079 days.

(21) Appl. No.: 12/022,247

(22) Filed: Jan. 30, 2008

(65) Prior Publication Data

US 2009/0191925 A1    Jul. 30, 2009

(51) Int. Cl.
*H04L 12/58* (2006.01)
*H04M 3/42* (2006.01)
*H04B 1/38* (2006.01)
*G06F 7/00* (2006.01)
*G06F 17/00* (2006.01)

(52) U.S. Cl.
USPC ............... 455/412.1; 455/414.1; 455/573; 455/572; 455/557; 707/621; 707/610; 707/622

(58) Field of Classification Search
USPC ............. 455/573, 572, 557, 412.1, 414.1; 707/621, 610, 622
See application file for complete search history.

(56) References Cited

U.S. PATENT DOCUMENTS

| 2005/0156712 | A1* | 7/2005 | Jyrinki ................. 340/286.01 |
| 2005/0239497 | A1* | 10/2005 | Bahl et al. ............... 455/552.1 |
| 2006/0158154 | A1 | 7/2006 | Maurilus |
| 2007/0207729 | A1* | 9/2007 | Chen et al. ................. 455/15 |
| 2008/0168292 | A1* | 7/2008 | Freedman ................. 713/375 |

OTHER PUBLICATIONS

Synthesis AG—News; "Apr. 6, 2006—The Long Awaited Scheduled Automatic Sync Option for PalmOS Based Devices is Now Supported for the First Time in the New Preview/Beta Release of the Synthesis SyncML Client"; 3 Pages.

* cited by examiner

Primary Examiner — Opiribo Georgewill (57) ABSTRACT

Described below are methods and devices to automatically effect data transfer, for example for backing up data of a device, between a mobile communication device and another device, upon detection by the mobile communication device of charging current received for example from a charger. When a charger or a charging current is detected, the mobile device detects what connectivity links, such as for example, USB, Bluetooth, and/or WiFi, are available between the mobile device and another device. An automated process selects an appropriate connectivity link and then initiates one or two-way transfer of data over the automatically selected connectivity link according to the data transfer rules set by the user or by a default mechanism or algorithm. In this manner backup and/or update of data may take place automatically upon connection of a user's mobile communication device to a source of charging current.

20 Claims, 3 Drawing Sheets

DEVICES AND METHODS FOR DATA TRANSFER DURING CHARGING OF A PORTABLE DEVICE

FIELD

Disclosed are methods and devices for data transfer between a portable device and another device, and more particularly methods and devices for data transfer between a portable device and another device during charging of the portable device.

BACKGROUND

Mobile communication devices, such as cellular telephones and PDAs, have become an important part of everyday life. Portable devices are now being used not only for communication, but also to store many forms of data generated or downloaded during their use, including personal information such as calendar appointments, emails, pictures, video clips, and sound clips.

Often a user will connect his or her portable device to a larger device having more memory or computing capability, in order to transfer data between the two devices, whether for data backup purposes or for example, to update a calendar, phonebook, text messages sent and received, music and other media downloaded, as well as received and placed call records. For example, the larger device could be in the form of a home media set-top box, a personal computer, a wide area network server, or an internet server. The mobile device may be connected with the larger device via for example a USB cable, a WiFi home network or hotspot, or a Bluetooth wireless connection.

Data transfer between the mobile communication device and another device typically requires that the mobile device be powered, for example from its battery or from a wall outlet. With the large amounts of data that can be stored on today's portable devices, the time for a data transfer can be longer than the time available on the device's battery. Alternatively, the device can be connected for data transfer while it is being charged, but one or more manual steps must be taken by a user after the portable device is connected to the other device, in order to initiate the transfer of data between the two devices during charging.

The manual steps a user must take to initiate data transfer between a mobile device and another device are cumbersome and time consuming. Initiating data transfer becomes even more problematic when a mobile device contains multiple mechanisms for connecting with another device, such as both a wired connection like a USB connection, and one or more wireless connectivity mechanisms like WiFi and Bluetooth. Each type of wireless connectivity must be set up and configured. Thus a more convenient solution for portable devices to the problem of data transfer may be desirable.

DETAILED DESCRIPTION

It would be beneficial to have methods and devices by which a user of a mobile communication device can easily transfer data between the mobile communication device and another device without cumbersome and time consuming manual setup procedures. It would further be beneficial if a data transfer could take place during charging so that the battery life of the device is not an issue during data transfer. It would also be beneficial if a data transfer is an automated process upon charging the device. It would in addition be beneficial if a user could better ensure safety of data of a mobile communication device by backing up the data and/or synchronizing data during regular charging of the mobile communication device, for example, during nightly charging.

Described below are methods and devices to automatically effect data transfer between a mobile communication device and another device, upon detection by the mobile communication device of charging current received for example from a charger. Data transfer can include for example, backing up calendar data, phonebook data, music and other media, placed and received messages and calls, as well as internet sites viewed. Data transfer can also include synchronizing calendars, contacts and/or email. When a charger or a charging current is detected, the mobile device detects what connectivity links, such as for example, USB, Bluetooth, and/or WiFi, are available between the mobile device and another device. An automated process selects an appropriate connectivity link and then initiates one or two-way transfer of data over the automatically selected connectivity link according to the data transfer rules set by the user or by a default mechanism or algorithm. A user may set up data transfer rules that govern data transfer, that is, the types of data transferred, between the mobile communication device and another device.

Rules that govern what data gets transferred could include transferring of the newest data, the most accessed data, the highest rated data, or data that is marked as favorite. The data transfer rules could also specify a specific device on a network with which to transfer the data, and could in addition specify one or more locations on that device (for example, one or more folders). Additionally, the data rules can also specify the most appropriate transfer mechanism for a particular kind of data, based on necessary bandwidth, quality of the connection, and duration of the transfer. It is understood that the data may include any type of data, including music, videos, games, contacts, calendars, call logs, etc. It is further understood that some types of data may be synchronized rather than transferred, meaning data is sent both to and from the device. In this manner backup and/or update of data, synchronization of data, or both update and synchronization of data may take place automatically upon connection of a user's mobile communication device to a source of charging current.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
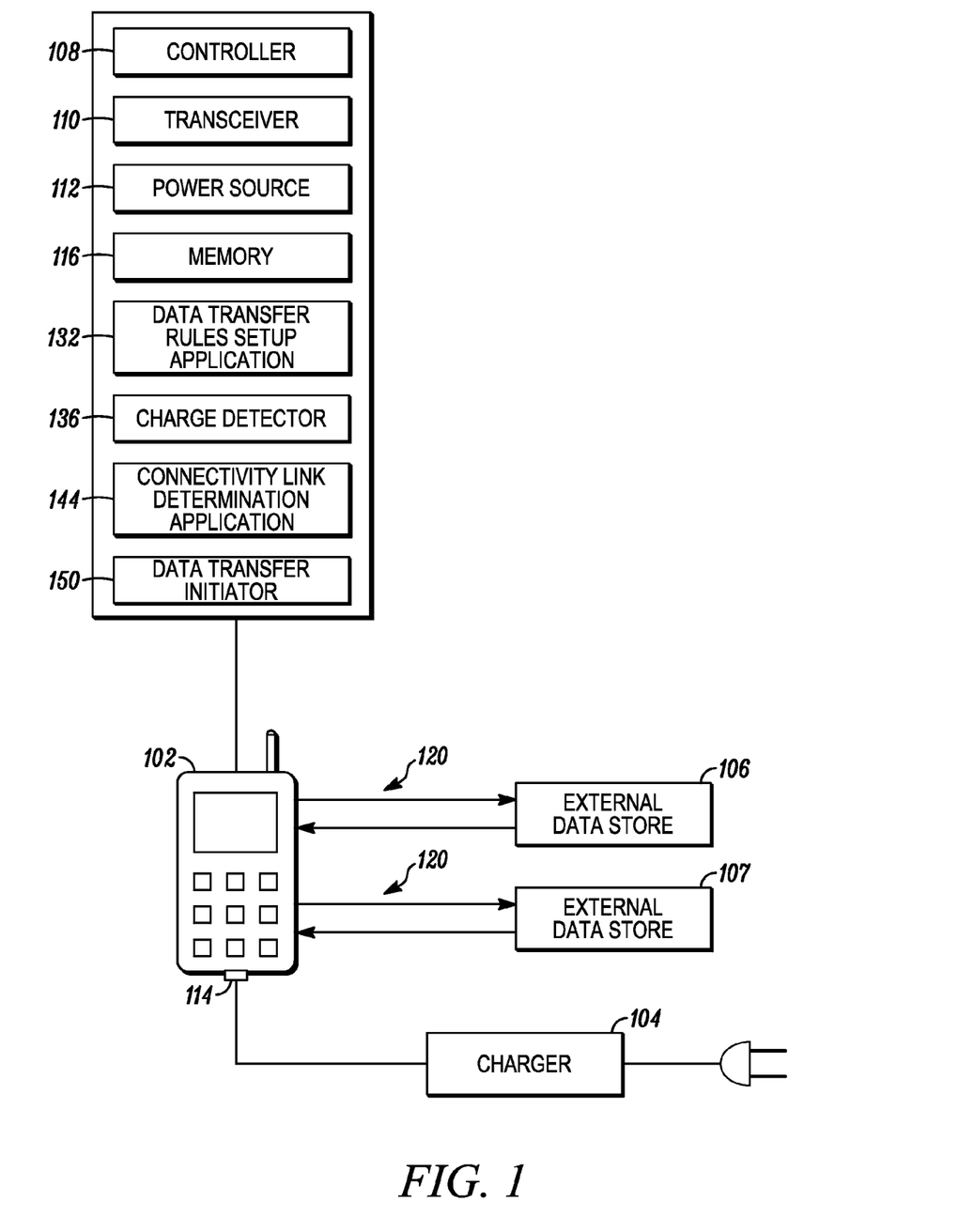
FIG. 1 shows an embodiment of a mobile communication device that may transfer data upon connection to a source of charging current.

FIG. 1 shows an embodiment of a mobile communication device 102 that may automatically transfer data upon detection of a charging current such as may be received from, for example, a charger 104. The mobile communication device 102 may automatically detect what connectivity links may be available for the purpose of transferring data between the mobile communication device 102 and, for example a data storage device 106 which may be a stationary or a portable device. In this way, the data transfer may be substantially automatically initiated without a cumbersome and time consuming setup process by the user. In this disclosure the mobile communication device 102 may be referred to as a first device and the data storage device 106 may be referred to as a second device. It is understood that the data storage device 106 may be one of a plurality of data storage devices. A second data storage device 107 of the plurality of data storage devices is shown.

The connectivity links that as discussed below are determined by a connectivity module or application may include, for example, Universal Serial Bus (USB), Bluetooth, WiFi, Ultra Wideband (UWB), and/or other types of connectivity for data transfer. Upon successful setup of a connectivity link for data transfer between the mobile communication device 102 and the data storage device 106 and/or 107, the data transfer may commence. In this manner a user of a mobile communication device 102 may transfer data between the two devices 102 and 106, for example, for purposes of data backup or data update, with a minimal number of manual steps. It is understood that data transfer may take place between the devices 102 and 107 as well.

The mobile communication device 102 includes a controller 108 configured to execute instructions that may be, for example, application instructions. The mobile communication device 102 may in addition include a transceiver 110 coupled to the controller 108. The transceiver 110 may provide a wireless connectivity link with another device. The transceiver 110 may support, for example, Bluetooth, Worldwide Interoperability for Microwave Access (WiMAX), WiFi, UWB, or another wireless technology that may be used for a data transfer.

The mobile communication device 102 may be implemented for example, as a cellular telephone (also called a mobile station or user equipment). The mobile communication device 102 represents a wide variety of devices that have been developed for use within various networks. Such communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Herein, wireless communication technologies may include, for example, voice communication, the capability of transferring digital data, SMS messaging, Internet access, multi-media content access, and/or voice over internet protocol (VoIP).

As discussed above, the initiation and processing of a data transfer occurs upon detection of a charging current. Also as mentioned, it may be beneficial to process a data transfer during charging because data transfer may consume substantial power, and may otherwise deplete a power source or battery. The power source 112 that provides power to the mobile communication device 102 may be, for example, a Li-Ion battery, a NiCad battery, or a battery that uses another rechargeable battery technology and therefore may need regular recharging. The power source 112 is configured to receive a charging current, for example from the charger 104. A charger port 114 may be provided on the device 102 for connection to the charger 104. The mobile communication device 102 further includes a memory 116 coupled to the controller 108 and configured to store data.

As discussed briefly above, a user may set up data transfer rules that govern data transfer between the mobile communication device 102 and another device. Alternatively, the data transfer rules may be previously stored default rules. It is understood that any manner in which to provide data transfer rules is within the scope of this discussion. Accordingly, the mobile communication device 102 may include a data transfer rules setup application 132 configured to receive rules input to govern data transfer between the mobile communication device 102 and the data storage device 106 and/or data storage device 107. That is, the data transfer rules indicate which data to transfer, for example, via a menu delivered when charging is initiated, or may automatically determine when there has been a change in data and automatically store new or revised data stored in the device 102. Moreover, the data transfer rules may indicate which data to transfer between the device 102 and the data storage device 106, and which data to transfer between the device 102 and the data storage device 107. In this manner data synchronization among the multiple devices 102, 106, and 107 may be accomplished via the data transfer rules.

In one embodiment, a data transfer rule may indicate for example, which devices are "my devices" on the network. Any device that is "my device" may be desired to have the same data as each additional "my device", with certain exceptions, such as data that is too large for the storage capacity of a mobile device. In the case where the data is too large a sub-folder or special algorithm may be used to select which subset of data will be identical on all "my devices". A sub-folder may be created by the user, for example. Files to be synced may be stored in the sub-folder.

An example of an algorithm is one that adds the file size of the most recent data files until the storage amount available in the mobile device is reached. The most recent data is synchronized, instead of all of the data. The synchronization process transfers data to and from each "my device" until all devices' data becomes identical. This may require multiple passes and user intervention for conflict resolution since data may have changed differently on each device. A similar method can be used for data that is transferred (one-way) instead of synced (two-way).

Other data transfer rules may include selection of specific data types to be synced and/or transferred, for example, contacts, calendar data, pictures, videos, music, call logs, and other specific data types. A user may choose some or all of the data types. Other data transfer rules may include more details within a specific data type, for example via the use of meta tags. Pictures or videos may have meta tags identifying content of the pictures or videos, such as who is in it, the location, the date, and/or the time. A user can select to sync or transfer for example, only pictures of a certain person or pictures taken on a certain date, range of dates or at a specific location.

It is understood that many other possible data transfer rules in addition to the examples provided above are within the scope of this discussion.

The mobile communication device 102 further includes a charge detector 136 configured to detect a charging current to recharge the power source 112 to initiate the data transfer by executing one or more data transfer rules. As mentioned, by initiating a data transfer during a charge, the likelihood that the data transfer will be complete is high since the device is less likely to run out of power during the data transfer. Moreover, the mobile communication device 102 in addition includes a connectivity link determination application 144 that is configured to determine a connectivity link, for example, connectivity link 120, for data transfer between the mobile communication device 102 and the data storage device 106 and/or the data storage device 107, based on circumstances. It is understood that the connectivity link 120 may be a network connection, for example a USB connection to a router or hub, or a wireless link to a wireless local area network (WLAN). It is further understood that the connectivity link 120 may include connections to more than the data storage devices 106 and 107, for example. The connectivity link determination application 144 is configured to decide among different connectivity links 129, as discussed further below. That is, the connectivity link determination application 144 will choose which link to use to transfer the data. Accordingly, the mobile communication device 102 also includes a data transfer initiator 150 that is configured to initiate data transfer between the mobile communication device 102 and the data storage devices 106 and/or 107, or other data storage devices, based on detection of a charging current to recharge the power source 112.

The data transfer rules setup application 132, the charge detector 136, the connectivity link determination application 144 and the data transfer initiator 150 can carry out certain processes of the methods as described herein. Steps of methods may involve modules, applications, and devices, and other modules, applications, and devices not discussed here may be inferred by the methods discussed herein. The modules, applications, and devices can be implemented in software, such as in the form of one or more sets of prestored instructions, and/or hardware, which can facilitate the operation of the mobile communication device as discussed below. The modules, applications, and devices may be installed at the factory or can be installed after distribution by, for example, a downloading operation in the case of software. The operations in accordance with the modules, applications and devices will be discussed in more detail below.

Figure 2:
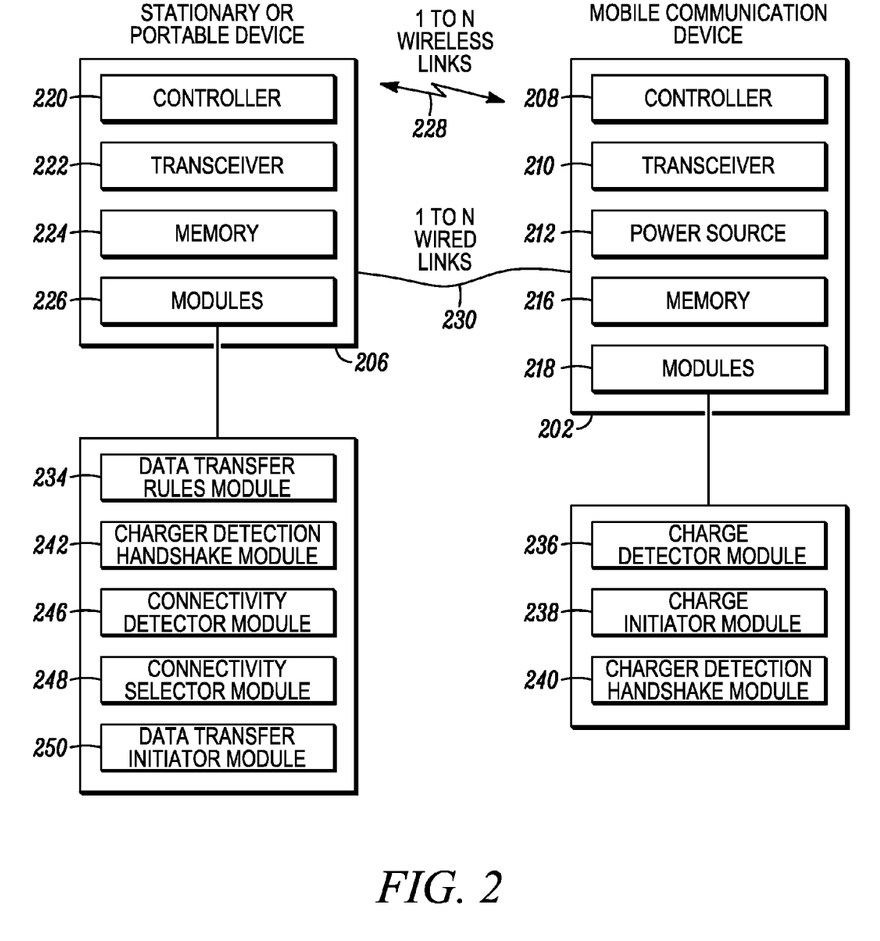
FIG. 2 shows an embodiment of a mobile communication device that includes a charge detection handshaking module and that is coupled to another device for data transfer.

FIG. 2 shows an embodiment of a mobile communication device 202 that includes a charge detection handshake module and that can be coupled to another device 206 for data transfer. The charge detection handshake module allows for synchronization of two or more devices. In FIG. 2, many of the modules are similar or analogous to the devices and applications of the mobile communication device 102 of FIG. 1, but not all are located on the mobile communication device 202; instead, some are located in device 206. As discussed below, only a charge detector and charge initiator, along with the charge detection handshake module mentioned above, are located on the mobile communication device 202.

FIG. 2 also includes a storage device or data store 206 analogous to the data storage device 106 or 107 of FIG. 1. The device 206 may be a stationary device, for example, a desktop computer or a server, or may be a portable device, for example, a laptop computer, a PDA, or even a cellular telephone. In this discussion, the storage device 206 is typically referred to as a stationary device 206, however it is understood that the device 206 may be any type of device including a portable device, as described above. The stationary device 206 can include data storage capability that may be analogous to the data storage device 106. As discussed, the charge detection by the mobile communication device 202 may cause initiation of a data transfer between the mobile communication device 202 and the stationary device 206. The mobile communication device 202 may automatically transfer data to and from the stationary device 206 upon detection of a charging current such as may be received from, for example, a charger 104. The stationary device 206 may also be referred to herein as a data store or a data storage device.

In the embodiment of FIG. 2, the stationary device 206 may detect what connectivity links may be available between the mobile communication device 202 and the stationary device 206. As discussed above in connection with FIG. 1, connectivity links may include, for example, USB, Bluetooth, WiMAX, WiFi, UWB, and/or other types of connectivity for data transfer. When the data transfer between the mobile communication device 202 and the data storage device 206 has been successful set up, the data transfer may commence. In this manner a user of a mobile communication device 202 may transfer data between the two devices 202 and 206, and may, therefore, effect data backup or data update, with a minimal number of manual steps.

As mentioned the data transfer can occur in one direction or in both directions 120 (see FIG. 1). It is understood that there may be more than one device analogous to device 202, and/or more than one device analogous to device 206. In this way, there may be data transfer between more than two devices. It is understood that there may be any number of devices between which data transfer may take place in a system as described herein.

The mobile communication device 202 includes a controller 208 configured to execute instructions in particular, data transfer rules to determine which data to transfer. The mobile communication device 202 may in addition include a transceiver 210 that may be coupled to the controller 208. The transceiver 210 may provide a wireless connectivity link with another device, for example, the stationary or portable device 206. The transceiver 210 may support, for example, Bluetooth, WiMAX, WiFi, UWB, and/or another wireless technology and which of these connectivity links to use may be determined by a connectivity module or application.

Similar to device 102 (see FIG. 1), the mobile communication device 202 includes a power source 212 that is configured to provide power to the mobile communication device. The power source 212 uses a rechargeable battery technology, and may be for example, a Li-Ion battery, a NiCad battery, or another type of battery. The power source 212 is configured to receive a charging current, for example from the charger 104. As described above in connection with FIG. 1, a charger port 114 may be provided on the device 202 for connection to the charger 104. The mobile communication device 202 further includes a memory 216 coupled to the controller 208 and configured to store data and instruction modules 218 that can carry out certain processes of the methods as described herein.

In the device 202, the modules 218 may include, for example, a charge detector module 236 configured to monitor the presence of a charging current. The modules 218 may further include a charge initiator module 238 that is configured to initiate charging of the power source 212 upon detection of a charging current. The modules 218, as mentioned above, may in addition include a charge detection handshake module 240 configured to send an indication to another device, such as, for example, the stationary device 206, that a charging current has been detected by the mobile communication device 202. As will be discussed below, the storage device 206 also includes a handshake module 242 to receive an indication that a charger has been detected by the device 202. Before discussing the modules 218 further, the stationary device 206 is described in more detail.

Analogous to the stationary device 106 (see FIG. 1) in that it can be configured to store data, the stationary device 206 includes a controller 220 configured to execute instructions, for example, of instruction modules. The stationary device 206 can in addition include a transceiver 222 coupled to the controller 220. The transceiver 222 can provide a wireless connectivity link with the mobile communication device 202. As discussed above in connection with the transceiver 210, the transceiver 222 may support, for example, Bluetooth, WiMAX, WiFi, UWB, and/or another wireless technology. In an embodiment there may be one or more wireless links 224 between the stationary device 206 and the mobile communication device 202. As mentioned above, the two devices 202 and 206 may alternatively or in addition be connected by one or more wired links 226, for example by USB.

The stationary device 206 further includes a memory 228 coupled to the controller 220 and configured to store data and instruction modules 230 that can carry out certain processes of the methods as described herein. The modules 230 may include, for example, a data transfer rules module 234 that is configured to process data transfer between the stationary device 206 and the mobile communication device 202. The modules 230 may in addition include a charge detection handshake module 242 configured to receive an indication from another device, such as, for example, the mobile communication device 202, that a charging current has been detected by the mobile communication device 202. As mentioned above, the charge detection handshake module 242 of the stationary device 206 is a counterpart to the charge detection handshake module 240 of the mobile communication device 202.

The modules 230 may in addition include a connectivity detector module 246 configured to detect at least one connectivity link between the stationary device 206 and the mobile communication device 202. The modules 230 may further include a connectivity selector module 248 configured to select a connectivity link to use for data transfer in accordance with an automated selection determination. The automated selection determination may be based on an algorithm or based on predefined criteria. An algorithm may include, for example, examining all available connectivity links for data transfer speed, then choosing the connectivity link with the highest data transfer speed. Predetermined criteria may include, for example, to always use a wired connectivity link, such as a USB cable connection, if available, for connectivity reliability. The modules 230 may further include a data transfer initiator module 250 that is configured to initiate data transfer between the stationary device 206 and the mobile communication device 202, based on detection of a charging current to the power source 212 and based on data transfer rules. In this manner a user may better ensure safety of data of the mobile communication device 202 by backing up the data during regular charging of the mobile communication device 202, for example, during nightly charging, for storage on the stationary device 206.

Steps of methods may involve modules and other modules (not discussed here) may be inferred by the methods discussed herein. The modules 218 and 230 can be implemented in software, such as in the form of one or more sets of pre-stored instructions, and/or hardware, which can facilitate the operation of the mobile communication device 202 and the stationary device 206 as discussed below. The modules may be installed at the factory or can be installed after distribution by, for example, a downloading operation. The operations in accordance with the modules will be discussed in more detail below. As in the embodiment described relating to FIG. 1, the user may simply initiate recharging the power source 212 by any suitable means, and based on the data transfer rules, the data may be transferred between devices in either or both directions 120 (see FIG. 1) automatically. In this way, the user avoids cumbersome and time consuming setup for data transfer during a charging process.

Figure 3:
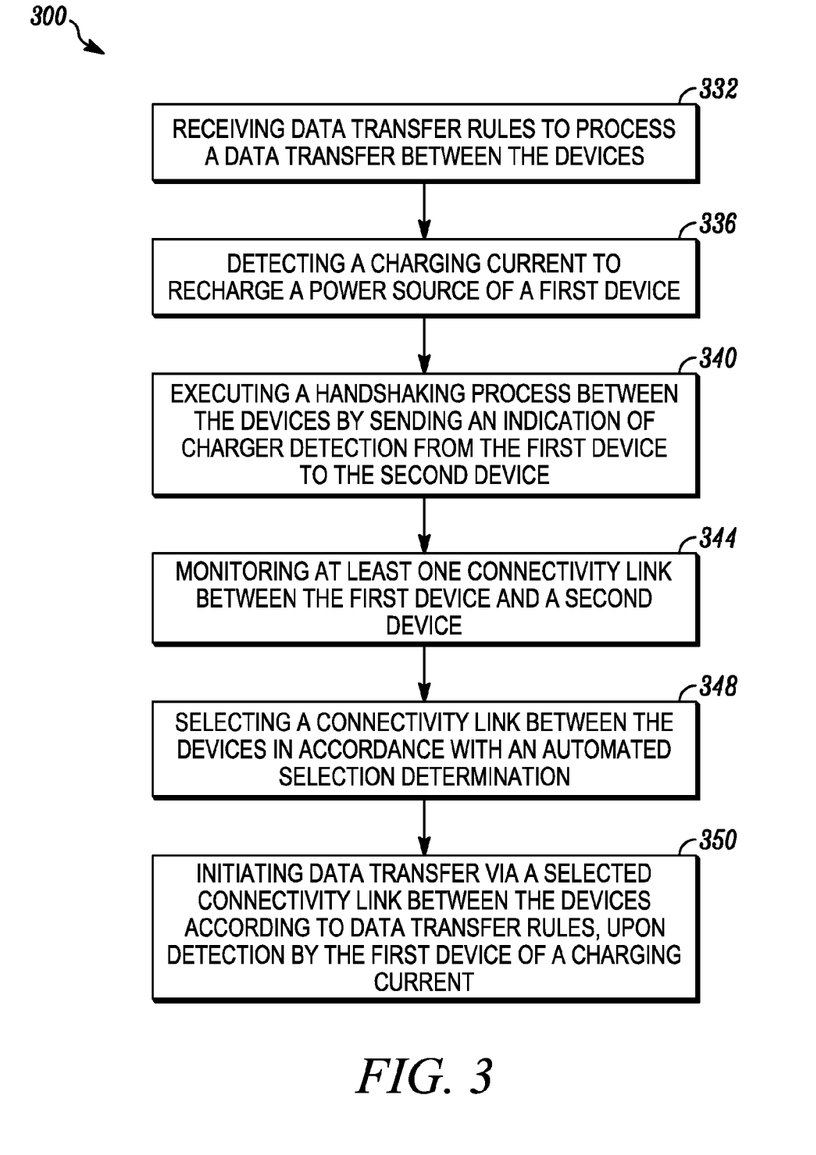
FIG. 3 shows a flow chart of an embodiment of a method of data transfer between a mobile communication device and another device.

FIG. 3 shows a flow chart of an embodiment of a method 300 of data transfer between a mobile communication device 102 (see FIG. 1) and a storage device 106 and/or 107, and/or between a mobile communication device 202 (see FIG. 2) and another device 206. It is understood that method steps may occur in a different order without departing from the scope of this disclosure. The differences between the embodiments described with respect to FIGS. 1 and 2 relate to which devices include certain functions. Therefore, the flow chart of FIG. 3 may be read to describe either embodiment shown, and those not shown but described.

The stationary device 206 may receive 332 data transfer rules to process a data transfer between the stationary device 206 and the mobile communication device 202. As mentioned, the data transfer rules may be generated by a user or may be default rules. It is understood that in another embodiment, for example the embodiment of FIG. 1, the mobile communication device 102, rather than the stationary device 106 and/or 107, may receive the data transfer rules to process a data transfer between the stationary device 106 and the mobile communication device 102. The receiving 332 of the data transfer rules may take place in accordance with a data transfer rules setup application 132 (see FIG. 1) or in accordance with a data transfer rules module 234. As discussed above, a user may determine which data to transfer, such as sent and received messages, phonebook updates, media downloads and calendar updates. Data transfer rules may be by default as well.

When a user connects the mobile communication device 202 (see FIG. 2) to a charger, for example charger 104 (see FIG. 1), the mobile communication device 202 may detect 336 the presence of a charging current to recharge the power source 212 of the mobile communication device 202, in accordance with the charge detector 136 and/or the charger detection module 236.

The charge detector 136 (see FIG. 1) and/or the charger detection module 236 (see FIG. 2) may detect that the mobile communication device 202 receives a charging current. In an embodiment the charge detector 136 and/or the charger detection module 236 may detect the presence of an external source of charging current, for example, a charger cable, coupled to the charger port 114. In an embodiment the charge detector 136 and the charger detection module 236 may be distinct. In another embodiment the charge detector 136 for example, may be a component of the charger detection module 236.

The charging of the power source 212 (see FIG. 2) may commence in accordance with the charge initiator module 238. The charge initiator module 238 may for example, monitor the charge state of the power source. The charge initiator module 238 may in addition monitor whether a charging current has been detected by the charge detector 136 (see FIG. 1) or the charger detection module 236. In an embodiment, the charge detector 136 or the charger detection module 236 may notify the charge initiator module 238 when a charging current has been detected. The charge initiator module 238 may provide that the power source 212 receive charge appropriate to its charge state, and based on the presence of a charging current. In this manner the power source 212 may be replenished by connection of the mobile communication device 202 to a charger 104.

As mentioned, the embodiment of FIG. 2 includes charger detection handshake modules of devices 202 and 206. The mobile communication device 202 (see FIG. 2) and the stationary device 206 may execute 340 a handshaking process between the devices, for example by sending an indication of charger detection from the mobile communication device 202 to the stationary device 206. The handshaking 340 may be accomplished by a charger detection handshaking module 240 in the mobile communication device 202, together with a complementary charger detection handshaking module 242 in the stationary device 206.

The stationary device 206 (see FIG. 2) may monitor 344 at least one connectivity link between the stationary device and the mobile communication device 202. For example, the controller 220 may regularly poll or otherwise assess the status of the transceiver 222. In an embodiment, the transceiver 222 may represent a variety of transceivers, for example in the case where the stationary device 206 may communicate wirelessly according to more than one wireless technology 228. The controller 220 may then acquire connectivity link status information for one or more wireless connectivity links 228 and one or more wired connectivity links 230 in accordance with connectivity link determination application 144 (see FIG. 1) and/or in accordance with connectivity detector module 246. The connectivity link determination application 144 may be configured to determine a connectivity link based on an algorithm and/or based on predefined criteria, as discussed below in connection with the connectivity selector module 248.

The controller 220 selects 348 a connectivity link between the stationary device 206 and the mobile communication device 202 based on the connectivity link status information for the one or more wireless connectivity links 228 and the one or more wired connectivity links 230. The selection 348 may be accomplished according to the connectivity selector module 248. As mentioned above, the connectivity selector module 248 is configured to select a connectivity link to use for data transfer in accordance with an automated selection determination. The automated selection determination may be based on an algorithm, or based on predefined criteria. An example of selecting a connectivity link based on an algorithm or predefined criteria includes choosing the fastest connectivity link, for example, WiFi, WiMAX, or UWB over Bluetooth. Another example of selecting a connectivity link based on an algorithm or predetermined criteria includes choosing the most reliable connectivity link, for example, a wired link like a USB cable. Other predefined criteria may include the most available link, that is, the link with the least traffic, the link with the least number of devices serviced by the link, and/or the link with the most optimal quality of service, where quality of service may be defined according to, for example, signal strength.

The stationary device 206 (see FIG. 2) and the mobile communication device 202 initiate 350 data transfer between the devices 202 and 206 according to data transfer rules, and based upon detecting a charging current by the first device, as discussed above in connection with step 336. The initiation 350 of the data transfer may be effected by a data transfer initiator module 250. In another embodiment, the initiation 350 of the data transfer may be effected by a data transfer initiator 150 (see FIG. 1). The activation and operation of the data transfer initiator 150 and/or the data transfer initiator module 250 may be coupled with the activation and operation of the charge initiator module 238. The data transfer may continue for example, so long as the charger 104 is connected to the mobile communication device 202. As mentioned previously, the data transfer may include, for example, calendar entries, emails, phonebook data, video and/or music clips, and images, among other data. Therefore, a user may ensure backup of their data during regular charging of the mobile communication device, for example, during nightly charging, without needing to remember to back up their data.

Methods and devices that may automatically transfer data upon detection of a charging current have been described. A mobile communication device may detect what connectivity links such as WiFi, Bluetooth, USB, etc., may be available between the mobile communication device 102 (see FIG. 1) and, for example a data storage device 106. Upon successful setup of data transfer such as transfer of calendar information, phonebook updates, sent and received messages, downloaded media files, etc., between the mobile communication device and the data storage device, the data transfer may commence. In this manner a user of a mobile communication device may transfer data between the mobile communication device and the data storage device, for purposes of, for example, data backup or data update, with a minimal number of manual steps, and may better ensure safety of the data of the mobile communication device by backing up the data, for example, during nightly charging.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A portable device configured to store data, comprising:
a controller configured to execute application instructions;
a power source configured to receive a charging current;
a memory coupled to the controller and configured to store data and applications;
a connectivity link determination application configured to determine at least one connectivity link for data transfer between the device and a plurality of other devices;
a charge detector configured to detect a charging current to recharge the power source of the device;
a data transfer rules setup application to receive rules input to govern data transfer between the device and a stationary device in communication with the device by the at least one connectivity link; and
a data exchange initiator configured to activate data exchange between the device and at least one of a plurality of other devices, based on:
detection of a charging current to recharge the power source of the device;
a charger detection handshake module in the portable device sending an indication of charging current being applied the portable device to the stationary device; and a data transfer initiator module in the stationary device initiating the data exchange from the portable device after receiving the indication of charger of charging current being applied the portable device from the portable device.

2. The device of claim 1, wherein the connectivity link determination application is configured to determine a connectivity link for data transfer based on at least one of an algorithm and predefined criteria.

3. The device of claim 1, wherein the at least one connectivity link is a wireless link.

4. The device of claim 1, wherein a connectivity link comprises at least one of a cellular link, internet link, USB link, a Bluetooth link, a WiMAX link, a UWB link, or a WiFi link.

5. The device of claim 1, wherein the charge detector is further configured to detect the presence of an external source of charging current.

6. A data transfer apparatus, comprising:
a controller configured to execute instructions;
a power source configured to receive a charging current;
a memory coupled to the controller and configured to store data and instruction modules;
a data transfer rules module stored in memory and configured to process data transfer between devices of the apparatus;
a data transfer rules setup application to receive rules input governing of data to another device;
a charger detector module, configured to monitor the presence of a charging current;
a charge initiator module configured to initiate charging of the power source upon detection of a charging current;
a charger detection handshake module configured to send an indication from a first to a second device indicating that a charging current has been detected at the power source, the second device in communication with the charger detection handshake module by at least one connectivity link;
a connectivity detector module configured to detect the at least one connectivity link between devices of the apparatus;
a connectivity selector module configured to select a connectivity link to use for data transfer in accordance with an automated selection determination; and
a data transfer initiator module in the second device and configured to initiate data transfer from the first device, in accordance with the rules input, based on detection of a charging current to the power source and based on data transfer rules;
wherein the first device of the apparatus comprises a portable device and the second device of the apparatus comprises a remote device;
wherein the charger detector module, the charger detection handshake module, and the charger detection module are located on the portable device, and the data transfer initiator module are located on the second device.

7. The data transfer apparatus of claim 6, further comprising:
a wireless transceiver coupled to the controller and configured to establish a connectivity link with a remote device.

8. The data transfer apparatus of claim 6, further comprising:
another charger detection handshake module configured to receive an indication from a device that a charging current has been detected by the portable device.

9. The data transfer apparatus of claim 6, wherein the automated selection determination is based on at least one of an algorithm and predefined criteria.

10. A method of data transfer between a portable first device and at least one second device, the method comprising:
receiving rules input at a data transfer rules setup application to govern data transfer between the portable first device and a second device in communication with the first device by at least one connectivity link;
detecting a charging current to recharge a power source at the first device;
sending an indication that the charging current is received at the first device from the first device to the second device;
monitoring the at least one connectivity link between the first device and the at least one second device;
selecting a connectivity link between the first device and the at least one second device in accordance with an automated selection determination;
receiving data transfer rules to process a data transfer between the first device and the at least one second device; and
in the at least one second device, initiating data transfer governed by the rules input from the first device with a data transfer initiator module disposed in the at least one second device via a selected connectivity link between the first device and the at least one second device, upon receiving from the first device the indication that the charging current is received at the first device from the first device according to data transfer rules.

11. The method of claim 10, further comprising:
initiating data transfer by the first device upon detection of a charging current connected to the first device.

12. The method of claim 10, wherein initiating data transfer comprises initiating two-way transfer of data between the first device and the at least one second device.

13. The method of claim 10, further comprising:
executing a handshaking process between the first device and the at least one second device by sending the indication that the charging current is received at the first device from the first device to the at least one second device upon detection of a charger connected to the first device.

14. The method of claim 10, wherein the data transfer rules comprise choosing a fastest connectivity link.

15. The method of claim 10, wherein detecting a charging current comprises detecting a presence of a charger cable.

16. The method of claim 10, wherein the data transfer rules comprise choosing a most reliable connectivity link.

17. The method of claim 10, wherein the data transfer rules comprise choosing a most available connectivity link.

18. The method of claim 10, wherein the data transfer rules comprise choosing a connectivity link having a most optimal quality of service.

19. The device of claim 1, wherein the data exchange initiator is further configured to initiate data exchange between the device and the at least one of the plurality of other devices, based on one or more data transfer rules, wherein the data transfer rules indicate some data of the portable device is to be transmitted to a first of the plurality devices and other data of the portable device is to be transmitted to a second of the plurality of devices.

20. The method of claim 10, wherein the data transfer rules indicate some data of the first device is to be transmitted to a first of the at least one second device and other data of the first device is to be transmitted to another of the at least one second device.

* * * * *